United States Patent [19]

Beining

[11] 3,931,130
[45] Jan. 6, 1976

[54] PROCESS FOR REMOVING RESIDUAL VOLATILE SOLVENT IMPURITIES FROM POLYMER MOLDING PELLETS

[75] Inventor: Heinz Beining, Hamm-Westtuennen, Germany

[73] Assignee: Du Pont of Canada, Ltd., Montreal, Canada

[22] Filed: Jan. 16, 1974

[21] Appl. No.: 433,708

[52] U.S. Cl. ... 260/88.2 S; 260/94.9 R; 260/94.9 F; 260/93.7
[51] Int. Cl.² ............... C08F 210/00; C08F 212/00
[58] Field of Search ......... 260/88.2, 94.9 R, 94.9 F, 260/93.7; 450/774

[56] References Cited
UNITED STATES PATENTS

| | | | |
|---|---|---|---|
| 3,090,744 | 5/1963 | Scoggin | 260/85.3 |
| 3,189,588 | 6/1965 | Hull et al. | 260/93.7 |
| 3,591,569 | 7/1971 | Ilavsky | 260/88.2 |
| 3,847,886 | 11/1974 | Blunt | 260/89.1 |

FOREIGN PATENTS OR APPLICATIONS

| | | |
|---|---|---|
| 628,784 | 10/1961 | Canada |
| 836,977 | 4/1970 | Canada |

*Primary Examiner*—Edward J. Smith
*Assistant Examiner*—A. L. Clingman

[57] ABSTRACT

An improved process for the treatment of pellets of a partially crystalline polymer to aid in the removal of volatile impurities from the polymer pellets is disclosed. The improvement comprises the step of contacting the polymer with water at a temperature at least as high as the boiling point of the solvent used in the polymerization process, the temperature being between the boiling point and the temperature at which the pellets of polymer agglomerate. In preferred embodiments the polymer is an ethylene polymer, e.g., an ethylene homopolymer or copolymer of ethylene and a higher $\alpha$-olefin (e.g. butene-1), and the process is conducted as a continuous process at temperatures between 115° and 125°C.

10 Claims, 2 Drawing Figures

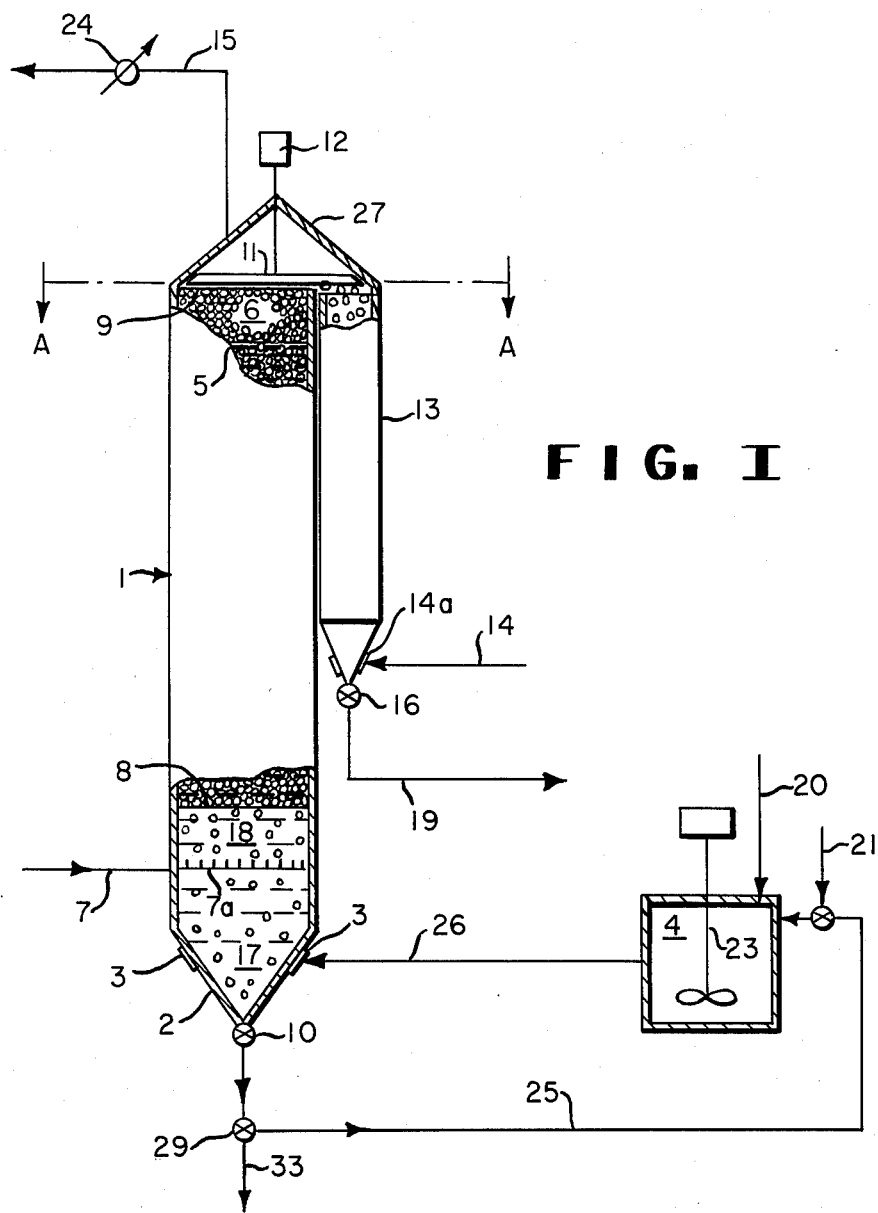
FIG. I
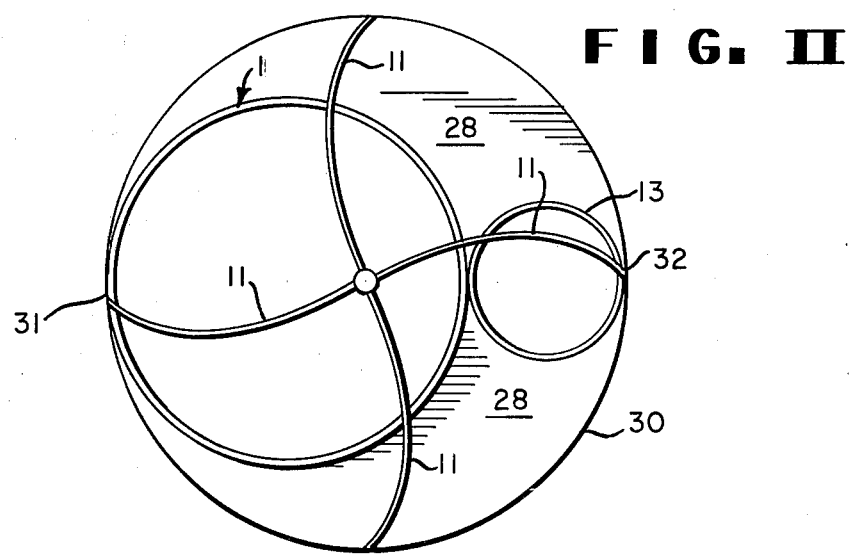
FIG. II

PROCESS FOR REMOVING RESIDUAL VOLATILE SOLVENT IMPURITIES FROM POLYMER MOLDING PELLETS

FIELD OF THE INVENTION

This invention relates to a process for the treatment of partially crystalline polymers for the removal of volatile impurities. In particular, the invention relates to a continuous process for the treatment of such polymers in pellet form, especially olefin polymers in pellet form, by contacting the polymer with hot water.

Many polymers are polymerized from monomers in the presence of a solvent. The solvent is frequently an organic solvent and in the case of the polymerization of olefins the solvent is usually hydrocarbon solvent. After polymerization, the polymer is separated from the bulk of the solvent by known techniques, such as described in U.S. Pat. No. 3,090,774 or Canadian Pat. No. 628,784. However, in commercial scale processes these techniques normally result in leaving small amounts of solvent dissolved in the polymer, especially after the polymer has been converted into the form of pellets. It is desirable, both from the effect of the loss of solvent on the economics of the process and because of potential toxicological, fire and/or explosion hazards to remove from the polymer as high a percentage of residual volatile impurities, especially solvent, as is practical.

PRIOR ART

Processes for treating polymers in pellet form to remove residual volatile impurities, for example solvent, are known. One such process is that disclosed by R. E. U. Routley and R. Seller in Canadian Pat. No. 836,977, which issued on 17th March 1970 and in which a mass of pellets is subjected to a gaseous stream of a mixture of dry steam and hot air. Such a process has not been found to be fully satisfactory, especially with polymers which tend to agglomerate at temperatures near to or below 100°C. For example, if the steam is passed upwardly through, and countercurrent to the flow of polymer, the back pressure that the steam must overcome in treating the polymer at an economic rate may require the use of steam of such a high pressure, and therefore such a high temperature, that the polymer tends to agglomerate. In such a process very rapid flow of steam is required to effectively strip the solvent from the dry pellets. Moreover, the contact between pellets results in areas of relatively high pressure in sections of the apparatus, depending on the configuration of the apparatus, thereby causing localized areas of agglomerated polymer pellets which remain in the apparatus. Hence in processes involving the use of steam, it has been a difficult problem to design apparatus which will substantially eliminate mixing between successive batches of polymeric material.

SUMMARY OF THE INVENTION

It has now been found that a process for the treatment of crystalline olefin polymers in pellet form for the removal of volatile impurities can be improved by contacting the pellets with heated water under atmospheric or super-atmospheric conditions.

Accordingly, the present invention provides, in a process for the treatment of pellets of a partially crystalline thermoplastic polymer to remove residual volatile impurities, the improvement comprising the step of contacting the polymer with water at a temperature at least as high as the boiling point of the solvent used in said polymerization process, the temperature of the water being between said boiling point of said solvent and the temperature near the crystalline melting point at which the pellets of polymer agglomerate.

In the preferred embodiment, the invention provides a continuous process for removing residual solvents, or other volatile impurities, from polymer pellets in which the pellets, slurried with water, are passed into the base of cylindrical columns filled with water and pellets, the water is heated with steam, pellets are passed upwardly through the water in plug-flow fashion and continuously removed from the top of the column while water is continuously withdrawn from bottom and recirculated. The pellets removed from the top of the column are passed through a steam drier system.

FIG. I shows a schematic diagram of an apparatus suitable for the preferred process of this invention.

FIG. II shows a top view at position A—A of FIG. I, showing pellet sweeper configuration in relation to main stripping column 1 and auxiliary drying tower 13.

DESCRIPTION OF THE INVENTION

In an embodiment, the pellets of polymer treated in the process of the present invention are pellets of a crystalline, thermoplastic poly-$\alpha$-olefin, and in a preferred embodiment, the poly-$\alpha$-olefin is a polymer of ethylene or a copolymer of ethylene and a higher $\alpha$-olefin, for example butene-1.

In a further embodiment, the pellets are contacted with water at a temperature of at least 100°C. especially when the volatile impurity is cyclohexane or other aliphatic or cycloaliphatic hydrocarbon having a boiling point at atmospheric pressure below 100°C.

The process of the present invention can be operated over a range of temperatures. The lower temperature limit is at or preferably substantially above the boiling point of the solvent used in the polymerization process while the upper temperature limit is that temperature at which the pellets of the polymer agglomerate. This higher temperature is a few degrees, usually about 8°C., below the crystalline melting point of the polymer. The lower temperature limit is determined mainly by the rate at which it is desired that the volatile impurities, and especially solvent, be removed from the pellets of the polymer. From an economic viewpoint, this rate should be as rapid as feasible.

The upper temperature limit is determined mainly by the temperature at which agglomeration of the pellets of the polymer occurs, which is primarily determined by the crystalline melting point and secondarily by the molecular weight of the polymer. When agglomeration occurs, the polymer will not flow freely through the apparatus used for the treatment process of the present invention, or through subsequent apparatus, thereby resulting in partial or complete blockage of such apparatus and/or in mixing with polymer subsequently fed to the treatment apparatus. Such mixing will result in contamination of the second polymer especially if the second polymer is of a different type, for example is of different molecular weight or is obtained from different monomers. Moreover, pellets within an agglomeration of pellets may contain more solvent after treatment for removal of solvent than similar pellets that are not within an agglomeration of pellets. The polymer and water mixture is heated by inert gaseous means, for example steam and/or air. One limitation on using higher temperatures is that this will require greater flow of steam or hot inert gas. Since often it is desired to prevent mixing of different increments or layers of the polymer pellets, such higher flow rates would cause a degree of agitation of the pellets and hence produce undesired mixing.

The polymer treated in the process is in the form of pellets, the shape and size of which may be varied, as is known. Usually such pellets are obtained by meltextrusion of a polymer from the synthesizer and cutting the extrudate. Typical pellets of an ethylene polymer may be either spherical or cylindrical in shape and be of average dimensions of about 0.12–0.20 inches. The size and shape of the pellets will be a factor in determining the time of treatment according to the process of the present invention.

While the water used in the process may be heated by any convenient method, a preferred method is to heat the water by injecting steam at a controlled rate and at a suitable temperature and pressure into the water.

The process of the invention may be operated on a batch or continuous basis, but the latter usually is preferred for large-scale manufacturing. In a batch process, the heated water may be passed either co-currently or counter-currently through the polymer for the desired time or the polymer can be placed in a stagnant hot water bed. The continuous process may be operated so as to minimize mixing of polymer or to obtain any desired level of mixing. The first type will be referred to hereinafter as plug-flow while the second type will be referred to as blending.

In a preferred plug-flow continuous process, the polymer is immersed in water for a period of time under conditions that minimize mixing. The water may be made to move co-currently with, or counter-currently to, the movement of the polymer. In one modification of the process volatile materials are separated from the mixture of water and polymer at one or more intermediate positions between the point at which the pellets are contacted with water and the point where the pellets are separated therefrom. However, the feasibility of such partial separation often will be dependent on the shape of the vessel; for example, such separation may not be practical in an elongated vessel in which the longitudinal axis is vertical.

The design of apparatus suitable for blending polymers while treating the polymers by the process of the present invention is also known. Such apparatus comprises one or more zones in which the water is moved co-currently with, or countercurrently to, the bulk movement of the pellets and contains means for the injection of steam and/or air.

Suitable apparatus for a plug-flow continuous process is an elongated vessel, especially a pipe. It is preferred that the longitudinal axis of the elongated vessel be vertical. When the pellets are fed to the apparatus as a mixture of pellets and water, it is desirable to remove a major portion of the water so added at a location in the apparatus that is near the location of the inlet for such mixture, if the water entering with the pellets is at a substantially lower temperature than the treatment temperature. This will minimize mixing of pellets during subsequent heating of the water to the desired temperature.

After treatment in accord with the process of the invention, the pellets may be separated from the water by known techniques —for example the use of baffles, sieve plates, rotating paddles and screws. In order to dry the pellets, they are then contacted with steam, especially dry steam, or a heated gas inert with respect to the polymer at the temperature of the pellets, in order to thoroughly dry the treated pellets after separation of the pellets from the water.

When water is used in accord with the process for the removal of volatile impurities from a polymer, there will be relatively little pressure between pellets, thereby making possible the use of higher temperatures compared with a process using steam for the removal of volatile impurities. The use of higher temperatures in the water treatment process results in higher rates of removal of volatile impurities and shorter contact times needed to obtain a desired lowering of the level of volatile impurities in the pellets.

FIG. I is a schematic side view of apparatus suitable for use in the preferred continuous process. A cylindrical tower, 1, has a conical base, 2. The tower, 1, is filled with water to level 5. Polymer pellets, moving upward in plug-flow, fill column from position 8 to position 9, above water level 5 at top. Zone 6 contains only pellets having water films on surfaces. The polymer pellets slurried in cool water enter the system through ports 3 circumferentially spaced around conical base 2 and rise up from cool zone 17 through hot water zone 18 to base 8 of the column of pellets floating in water. The water is heated by steam entering through port 7 and distributed through manifold 7a into the water below the base of the bed of pellets in water. Cool water is continuously withdrawn through valve 10 at the base of conical bottom 2; a portion of this water is recirculated through pipe 25 to polymer-water slurry make-up vessel 4 together with fresh water entering through 21. The remainder of the withdrawn water is passed throughh pipe 33 to a steam distillation system for separation and recovery of the stripped volatile solvent. The polymer pellets from the melt-extrusion, cutting operation enter vessel 4 through inlet 20. Agitation is supplied by stirrer 23, and the slurry of pellets in water is continuously passed through pipe 26 to inlet ports 3. The polymer pellets form a cylindrical bed within tower 1 from lever 8 to the top, 9, of column which is maintained above the top 5 of the column of water. The bed of polymer pellets flows continuously upward in plug-flow fashion as pellets are continuously added to the bottom and continuously removed from the top. The pellets can be removed at the top, with the aid of sweeper blades 11 driven by motor 12, and passed into drying tower 13. One cover, 27, covers both columns 1 and 13 and contains a vapor outlet 15 and pressure regulator 24. An inclined chute 28 guides the pellets into the drying tower 13. Steam and/or hot nitrogen or air entering through line 14 is passed up through drying column 13 from inlet ports 14a and out through outlet 15 and pressure regulator 24. Volatilized solvent passing through outlet 15 may be recovered. The dried pellets are drawn off through valve 16 and passed through pipe 19 to blending or bagging operations. Valve 29 controls portion of water, drawn from bottom of stripper, which is directly recirculated.

In FIG. II there is shown a schematic top view looking down from position A—A of FIG. I. Inclined chute 28 provides pellet guide passage from top of stripping column 1 to top of drying column 13. Sweeper blades 11 sweep pellets, from top of stripping column 1 into drying column 13 via chute 28, and turn inside the circle 30 which is tangent to stripper column 1 at point 31 and tangent to drying column 13 at point 32. The diameter of the circle 30 is equal to the sum of the diameter of columns 1 and 13.

In the operation of the process, sweeper blades 11 are rotated slowly at a rate just sufficient to remove pellets from the top of column 1 at the same rate that pellets enter the bottom of column 1.

Thus this invention provides a process for the treatment of pellets of a crystalline, thermoplastic polymer to remove residual volatile hydrocarbon solvent by heating below the melting point of the polymer, in which the improvement comprises passing the pellets slurried with water into the base of a generally cylindrical, vertical column of hot water, passing the pellets in plug-flow upwardly through the column of hot water maintained at a temperature between 100°C. and about 8°C. below the crystalline melting point of the polymer while removing excess cooler water from the base of the column at a rate such that the height of the water in the column remains constant, continuously supplying heat to the base of the column of water at a rate sufficient to maintain the temperature in the column, maintaining sufficient pressure on the column to prevent boiling of the water, and withdrawing the pellets from the top of the column of water to a drying column where dry superheated steam and/or air is passed through to evaporate the water, and recovering the volatile solvent stripped from the pellets from the water drawn off from the bottom of the column by steam distillation.

The process of the present invention can be used for removing volatile materials from pellets of polymers of α-olefins particularly polymers of ethylene and copolymers of ethylene and a higher α-olefin, for example propylene, butene-1 or decene-1, and from crystalline polypropylene. The solvent used in the preparation of these polymers preferably is an aliphatic or cycloaliphatic hydrocarbon such as cyclohexane. Cyclohexane can be removed from polymers of ethylene and copolymers of ethylene and higher α-olefins at temperatures of, preferably, at least 100°C. in accord with the process. With some polymers of this type, for example some ethylene homopolymers and ethylenebutene-1 copolymers, especially of densities of 0.940–0.960, temperatures of 115°C. or even 125°C. are operable since the crystalline melting points of such ethylene polymers range from about 125°C to about 135°C.

The process of the invention is illustrated by the following examples, which, however are not intended to be limiting.

EXAMPLE I

Approximately 25 g. of a pelletized ethylene polymer, obtained from a commercial low pressure ethylene polymerization process employing coordination catalysts and using cyclohexane as solvent, were placed in an excess of water at either 100°C. or 125°C.

For tests at 100°C. the water was boiled at atmospheric pressure. The pellets were allowed to move freely within the water, which is designated as agitation in Table I, or were constrained by means of wire mesh in those cases where the pellets were not agitated.

For tests at 125°C. the mixture of pellets and water were placed in a vessel capable of being pressurized. The mixture was then heated under autogenous pressure in the sealed vessel to 125°C. with the pellets being allowed to move freely in the water.

At intervals samples of the pellets were removed, air dried at ambient temperature and analyzed for volatile matter as follows: 2.5 g. of polymer were added to 200 ml of boiling tetrachloroethylene. The volatile material was distilled from the polymer/tetrachloroethylene and the distillate analyzed for the solvent, cyclohexane, by gas chromatography.

The results are given in Table I.

TABLE I

| Run | Polymer* | | Water Temp. °C. | Agitation | Volatile Matter (%) | | | | |
|---|---|---|---|---|---|---|---|---|---|
| | Density | Melt Index | | | 0 min. | 15 min. | 30 min. | 60 min. | 90 min. |
| 1 | 0.945 | 0.41 | 100 | no | 1.19 | 0.91 | NA | NA | NA |
| 2 | 0.945 | 0.41 | 100 | yes | 1.19 | 0.75 | NA | NA | NA |
| 3 | 0.961 | 13.6 | 100 | yes | 1.40 | NA | 0.83 | NA | NA |
| 4 | 0.961 | 13.6 | 125 | yes | 1.40 | NA | 0.31 | NA | NA |
| 5 | 0.959 | 4.23 | 125 | yes | 1.28 | NA | 0.29 | NA | NA |
| 6 | 0.965 | 35 | 100 | no | 1.64 | NA | 1.10[1] | NA | NA |
| 7 | 0.965 | 35 | 100 | yes | 1.64 | NA | 0.89 | NA | NA |
| 8 | 0.948 | 14.3 | 100 | yes | 1.74 | NA | NA | 0.72[2] | NA |
| 9 | 0.927 | 35 | 100 | yes | 1.56 | NA | 0.58 | 0.31 | NA |
| 10 | 0.955 | 0.40 | 100 | yes | 0.92 | NA | 0.52 | NA | NA |
| 11 | 0.920 | 0.60 | 100 | yes | 1.97 | NA | 0.74 | NA | NA |
| 12 | 0.917 | 1.0 | 100 | no | 1.13 | 0.62 | NA | NA | NA |
| 13 | 0.917 | 2.0 | 100 | yes | 1.29 | NA | 0.42 | 0.21 | 0.15 |

[1] 25 min.
[2] 45 min.
NA not analyzed
*Available from Du Pont of Canada under the trademark "Sclair". 0.96 density polymers are ethylene homopolymers, lower density polymers are ethylene-butene-1 copolymers.

EXAMPLE II

A vertical tubular vessel of FIG. 1 of 6-inch diameter and 2.5 feet long was capped at the lower end and fitted with a pellet outlet at the upper end. A pellet feed system essentially comprising a flexible tube was connected to an inlet through the capped lower end of the vessel. Water was added to the vessel to the level of the water outlet. Quantities of non-pigmented pellets, pigmented pellets and additional non-pigmented pellets, each slurried with water, were successively fed to the vessel thereby forming three separate and distinct layers of pellets in water, the bottom of the bed of pellets being 6 inches above the bottom of the tube. As additional pellets were fed to the vessel, with pellets being removed from the top of the vessel at the same rate, the layers of pellets moved upward in plug-flow while remaining undisturbed. The water fed to the vessel with the pellets was removed through a water outlet in the lower end of the vessel at a rate such that a constant water level was maintained in the vessel. Water temperature was controlled by the injection of steam into the lower end of the vessel.

The removal of ¾ to ⅞ of the cyclohexane solvent originally present was demonstrated by the test of Example I under these conditions.

EXAMPLE III

The process of Example II was repeated except that agitation was introduced to eliminate plug flow and provide blending. The layers of pellets were readily agitated by the introduction of bubbles of gas, for example air, at the lower end of the vessel. Blending of pigmented and non-pigmented pellets was demonstrated by the introduction of air, or sufficient steam to cause formation of bubbles, to the lower end of the vessel.

I claim:

1. In a process for the treatment of pellets of a crystalline, thermoplastic polymer to remove residual volatile solvents contained therein by heating below the melting point of the polymer, the improvement which comprises passing the pellets slurried with water into the base of a generally cylindrical, vertical column of hot water, passing the pellets in plug-flow upwardly through the column of hot water, said water being maintained at a temperature between at least 100°C. and about 8°C. below the crystalline melting point of the polymer, while removing excess, cooler water from the base of the column of water at a rate such that the height of the water in the column remains constant, continuously supplying heat to the column of water at a point above the base of the column at a rate sufficient to maintain the temperature in the column, maintaining sufficient pressure on the top of the column to prevent boiling of the water, and withdrawing the pellets from the top of the column of water to a drying column and there drying them with a hot gas comprising superheated steam while recovering the volatile solvent, stripped from the pellets, from the water drawn off from the bottom of the column, by steam distillation.

2. The process of claim 1 in which the polymer is an $\alpha$-olefin polymer.

3. The process of claim 2 in which the $\alpha$-olefin comprises ethylene.

4. The process of claim 3 in which the polymer is a homopolymer of ethylene.

5. The process of claim 3 in which the polymer is a copolymer of ethylene and a higher $\alpha$-olefin.

6. The process of claim 5 in which the higher $\alpha$-olefin is butene-1.

7. The process of claim 1 in which the temperature of the water is about 125°C. and the density of the polymer is in the range about 0.940 – 0.960.

8. The process of claim 1 in which the temperature of the water is about 115°C. and the density of the polymer is in the range about 0.940 – 0.960.

9. The process of claim 1 in which the volatile impurity removed comprises cyclohexane.

10. The process of claim 1 in which the crystalline, thermoplastic polymer is a polymer of ethylene having a density above 0.940, the volatile solvent removed is cyclohexane and the water temperature in the vertical column is maintained at a temperature in the range of 115° to 125°C.

* * * * *